US005672370A

United States Patent [19]
Durance et al.

[11] Patent Number: 5,672,370
[45] Date of Patent: Sep. 30, 1997

[54] METHOD OF PRODUCING A DRIED KRILL PRODUCT

[75] Inventors: Timothy Douglas Durance; Fang Liu, both of Vancouver, Canada

[73] Assignee: The University of British Columbia, Vancouver, Canada

[21] Appl. No.: 632,832

[22] Filed: Apr. 16, 1996

[51] Int. Cl.$^6$ ............................................. A23L 1/33
[52] U.S. Cl. .................... 426/241; 426/242; 426/643; 426/805
[58] Field of Search ........................ 426/241, 242, 426/643, 805

[56] References Cited

U.S. PATENT DOCUMENTS

| 4,251,557 | 2/1981 | Shimose et al. | 426/417 |
| 4,371,560 | 2/1983 | Hochhauser et al. | 426/643 |
| 4,520,574 | 6/1985 | Sugisawa et al. | 34/5 |

FOREIGN PATENT DOCUMENTS

| 51-191562 | 2/1976 | Japan | 426/643 |
| 58-81763 | 5/1983 | Japan | 426/643 |
| 58-76073 | 5/1983 | Japan | 426/643 |
| 59-220171 | 12/1984 | Japan | 426/643 |
| 63-263066 | 10/1988 | Japan | 426/643 |

Primary Examiner—Arthur L. Corbin
Attorney, Agent, or Firm—C. A. Rowley

[57] ABSTRACT

A new form of dried krill is provided by a plurality of substantially separate whole dried krill carcasses substantially all of which have a natural red color and sufficient strength and integrity to withstand normal handling without crumbling into small pieces and retain a strong wholesome fish aroma and flavor. The krill are dried by a method wherein a sequence of energy applications are applied at pressures below atmospheric and the surface of the product simultaneously swept by air to remove moisture. During the process the krill are subjected to a tumbling action. The energy applications are preferably microwave energy applications.

19 Claims, 3 Drawing Sheets

METHOD OF PRODUCING A DRIED KRILL PRODUCT

FIELD OF INVENTION

The present invention relates to a new form of dried krill and to a process and apparatus for producing such substantially dry krill.

BACKGROUND

Krill are small maxine crustaceans belong to the family Euphasiacea. They are closely related, but distinct from the shrimp family, Decapoda. More than 80 species of Euphasiacea are known but only about six species are commercially important, particularily *Eupahasia pacifica*, *E. superba*, *Thysanoessa spinifera*, *T. inspinata*, *T. longipes* and *T. rashii*. Frozen and dried krill and krill products are consumed as human food. Substantial quantities of krill are also caught and processed for animal feeds, especially fish feed.

The main current market for dried krill product is for fish food with another important market being human food where it is used as a flavorant. The texture, color, flavor and aroma are important characteristics of the dried krill and generally reflect the quality of the product.

Currently there are two known methods of drying krill to produce the product for the market. Both processes produce a dried krill with poor coloring and generally of small particle size, i.e. broken pieces, or more likely in powder form.

Freeze drying of krill is one of the process use to produce dried krill. In this process the krill are frozen shortly after they are caught and then freeze dried at a convenient time. The dried product is usually in block form. The krill are brittle and easily broken and are in many cases crushed into a powder. Freeze dried krill have a very low moisture content due to the nature of the drying process, exhibit a pale red color, initially has a mild aroma, but oxidizes quickly to take on a fishy odor and has a flat or oxidized flavor. Protein retention of freeze dried krill is excellent.

Another method of drying krill is air drying wherein the fresh krill is immediately blanched and then dried in trays or ground and spray dried. Obviously with this technique the krill is treated immediately. The resultant product has a high moisture content (greater than about 12%), may be in whole or broken form if tray dried or in powder form if spray dried, has a yellow to pale red color, very mild weak aroma and little flavor. Blanching and air drying of krill significantly reduces its protein content.

It will be apparent that the dried product formed by either of the two methods is not high quality in that the color aroma and flavor, which are some of the most important characteristics of the product have been significantly deteriorated.

BRIEF DESCRIPTION OF THE INVENTION

It is the main object of the invention to provide a new dried krill product that has a natural red color, is largely unbroken, has a strong, desirable characteristic odor and good taste and to provide a method and apparatus for producing same.

Broadly the present invention relates to a dried krill product comprising a plurality of substantially separate whole dried krill carcasses substantially all of which have a natural red color and sufficient strength and integrity to withstand normal handling without crumbling into small pieces and retain a strong wholesome fish aroma and flavor.

The present invention also relates to a method and apparatus for producing dried krill products in the form of whole but separate carcasses comprising arranging raw krill in an at least partially separated arrangement in a microwave transparent carrier, partially drying said raw krill to provide a partially dried product substantially free of surface moisture but containing a first amount of unbound moisture within its structure, heating said partially dried product by means of electromagnetic radiation, subjecting said partially dried product to a reduced pressure below atmospheric pressure during at least the portion of the period of time in which said product is subjected to electromagnetic radiation coordinated to provide a heated dried product containing, unbound within its structure, a second amount of moisture sufficient to generate flexibility and strength in the product, such that the form of whole krill is maintained during the drying process, and subjecting said krill to a tumbling action during said partial drying and said heating by means of electromagnetic energy.

Preferably said partial drying includes defrosting said raw krill prior to said heating said partially dried product by means of electromagnetic radiation, Preferably said subjecting to reduced pressure below atmospheric pressure includes sweeping surfaces of said product with moisture unsaturated air.

Preferably said below atmospheric pressure will be less than 120 Torr preferably less than 100 Torr and said pressure will be attained in less than 2 minutes preferably less than 1.7 minutes.

Preferably said second amount of moisture comprises between 10 and 40% by weight of the separate dried product.

Preferably said dried product will be at a temperature of between 40° and 90° C.

Preferably said electromagnetic radiation comprise microwaves

BRIEF DESCRIPTION OF THE DRAWING

Further features, objects and advantages will be apparent from the detailed description of the preferred embodiments of the present invention taken in conjunction with the accompanying drawing in which.

DESCRIPTION OF THE PREFERRED EMBODIMENT

The method of the present invention is suitable for the preparation of dried krill and other sea foods for either fresh krill or frozen krill which may be defrosted and pressed to remove some of the free water. In this description, the term wet product shall mean fresh or frozen krill or other sea foods to which the invention may be applied for example shrimp, algae, small fish, etc.

The following description will deal primarily with krill, but it is intended that the term krill to read where reasonable as any of other similar materials that may be treated or processed to advantage using the present invention. It will be apparent that when a different material is to be dried to provide the dried product the conditions will have to be tuned to obtain the desired natural color and high quality in the dried product.

Figure 1:
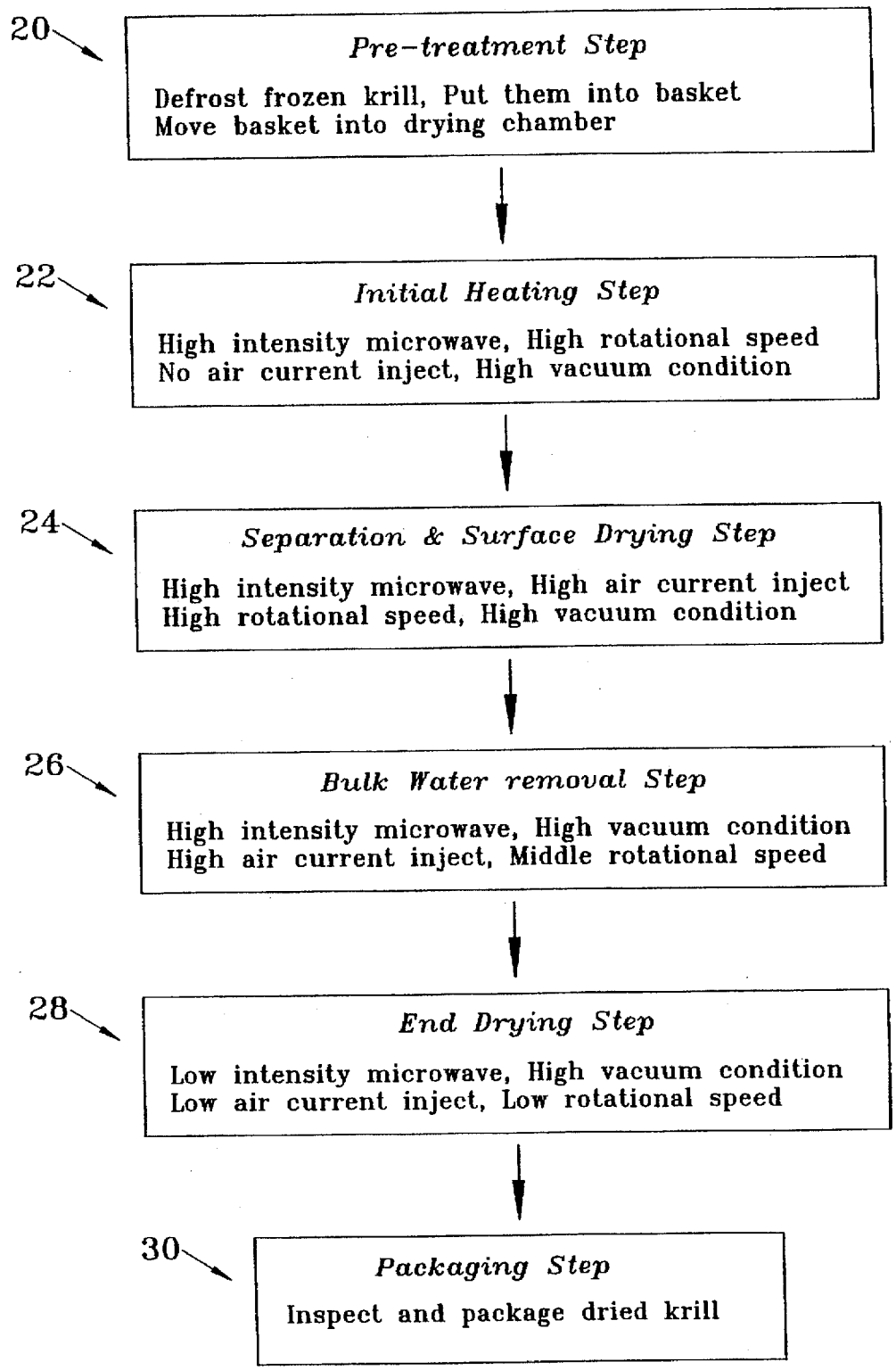
FIG. 1 is a flow chart of the method of the present invention.

As shown in FIG. 1, initial preparation of fresh or frozen krills as designated by the box 20 includes the steps of defrosting, if required, and weighting the fresh krill and arranging them in or on a microwave transparent carrier such as a basket or the like for transport. Preferably the fresh krill will also be treated to drain excess surface moisture by a pressing or centrifugation method.

In carrying out the method of the invention as part of the preparation stage 20 of FIG. 1 fresh krill are preferably placed in a suitable transport system such as the plastic basket drum and, if desired treated with suitable seasoning. If krill was frozen before drying, it will preferably be defrosted before drying, although defrosting can be achieved in the vacuum microwave chamber during a heating stage, if desired. It is believed that predrying of previously frozen and defrosted krill enhances the drying rate because some water is removed as drip loss and need not be evaporated.

After such treatment, the treated product is subjected to an initial heating step as indicated at 22 which at least partially dries the krills preferably by application of microwave energy under partial vacuum conditions with reduced oxygen concentration. During this initial heating step 22 water releases from the krill, drips from the baskets 64 (see FIG. 2) and is removed from the vacuum chamber 60 (FIG. 2) as liquid, through the vacuum pump 88 or through an optional draining system (not shown). The time to complete step 22 depends on the weight of fresh krill in the chamber and microwave power density and is set so that at the end of the initial heating step 22, the moisture content of the krill is about 70% to 78% by weight.

The initial heating step 22 is followed by a moisture separation and surface drying step 24. wherein a high intensity microwave field (more than about 0.6 kW/kg of krill) is applied. The intensity of the field in step 24 is preferably selected to raise the temperature of the krill to about 60° C. in about 10 minutes, thereby to rapidly convert a major portion of the moisture within the krills into a heated vapor. While typically raw krill have a moisture content of approximately 80% by weight and it is slightly reduced to about 70 to 78% in step 22, the expose of the krills to the high intensity microwave field in the moisture separation and drying at 24 applies sufficient heat to heat the krill the required temperature to substantially prevent enzyme reaction and also to reduce the moisture content, yet not so high as to damage the krill. The separation and surface drying step 24 is carried out preferably at a pressure of about 80 to 120 Torr and a temperature of about 47° C. to 55° C. The drying step 24 may take up to about 15 minutes.

In the preferred embodiment of the present invention, total moisture content of the krill leaving the stage 24 is about 60% to 75% by weight of the krills with desired optimum of about 73%.

The separation and surface drying step 24 serves to vaporize a substantial portion of the tissue moisture and flush the water vapor out of the chamber. It also serves to dry the shell surface of the krill, thereby allowing the subsequent bulk water drying step 26 of the present invention.

If the krill are insufficiently dried in the separation and surface drying step 24, the shell of the krill will be sticky and the krill will tend to form a ball if placed together in a revolving basket.

Air flow rates for these air currents in step 24 are preferably between about $2.8 \times 10^{-5}$ and $5.6 \times 10^{-5}$ m$^3$/kg.s flesh krill. Because a larger amount of moisture escapes from the krill during expose to the high intensity microwave field, the air injection method preferably is used to minimize condensation within the chamber. Such condensation would decrease the amount of microwave energy available for heating and drying krill because the condense again absorbs microwave energy in the chamber, is vaporized and may again condense on the chamber wall. This is called the "heat pump effect" and it greatly reduces microwave energy usage efficiency and increases the processing time if not minimized or prevented.

Next the partially dried krill are subjected to a bulk water drying step as indicated at 26 wherein further moisture is preferably removed by evaporation under below atmospheric pressure conditions and the use of air jets which spray dry air over the partially dried krill product i.e. the product is swept by air currents which pick up moisture from the surface of the product while it is simultaneously subjected to the application of high intensity microwave energy under below atmosphere pressure conditions.

In the bulk water removal step 26 the at least partially dried krill are exposed to a middle intensity microwave field for a period of time to raise their temperature to at least 50° C. within about 10 minutes and under a pressure of about 100 Torr to reduce the moisture content of krill to about 65% to 30% by weight. The temperature of krill is higher because in part of the increased mass flow resistance of the krill surface increases the vapor pressure inside the krill body thereby effecting the vapor temperature by thermodynamic relationship between vapor pressure and temperature The intensity of the microwave field and the duration of exposure is coordinated with the weight of fresh krill to achieve the desired dehydration and heating rates.

Preferably heat is being applied in the stage 22 and the separation and surface drying and bulk water removing steps 24 and 26 are carried out in the same closed vessel.

Obviously any step requiring pressure and/or a controlled atmosphere other than atmospheric must be carried out in some form of closed container which in some stages must also contain microwave energy when used. Where such conditions are not applied the krill need not to be so contained.

After a bulk removal step 26, the substantially dehydrated krill are finish dried in end drying step 28 to the desired moisture content by applying a low microwave intensity (about 0.4 kW/kg krill), high vacuum (less than 80 Torr) and a low air injection flow rate e.g. $2.8 \times 10^5$ m$^3$/kg.s. If desired, this end drying step 28 may alternatively be achieve using hot air drying at elevated temperature about 45° C. and at atmosphere air pressure, but finish drying in a conventional air dryer or oven is slower. With either option after end drying in step 28 the resultant product is a dried krill composed of substantially whole carcasses with natural red color, a moisture content of about 10% to 15% by weight and retaining its wholesome seafood aroma and flavor.

The krill is subjected to a tumbling action applied thereto by rotation of the basket or the like in which it is contained during the stages or steps 22, 24, 26 and 28 to facilitate the escape of moisture from the load of krill, permit more uniform drying and to impede the individual krill from sticking together.

Figure 3:
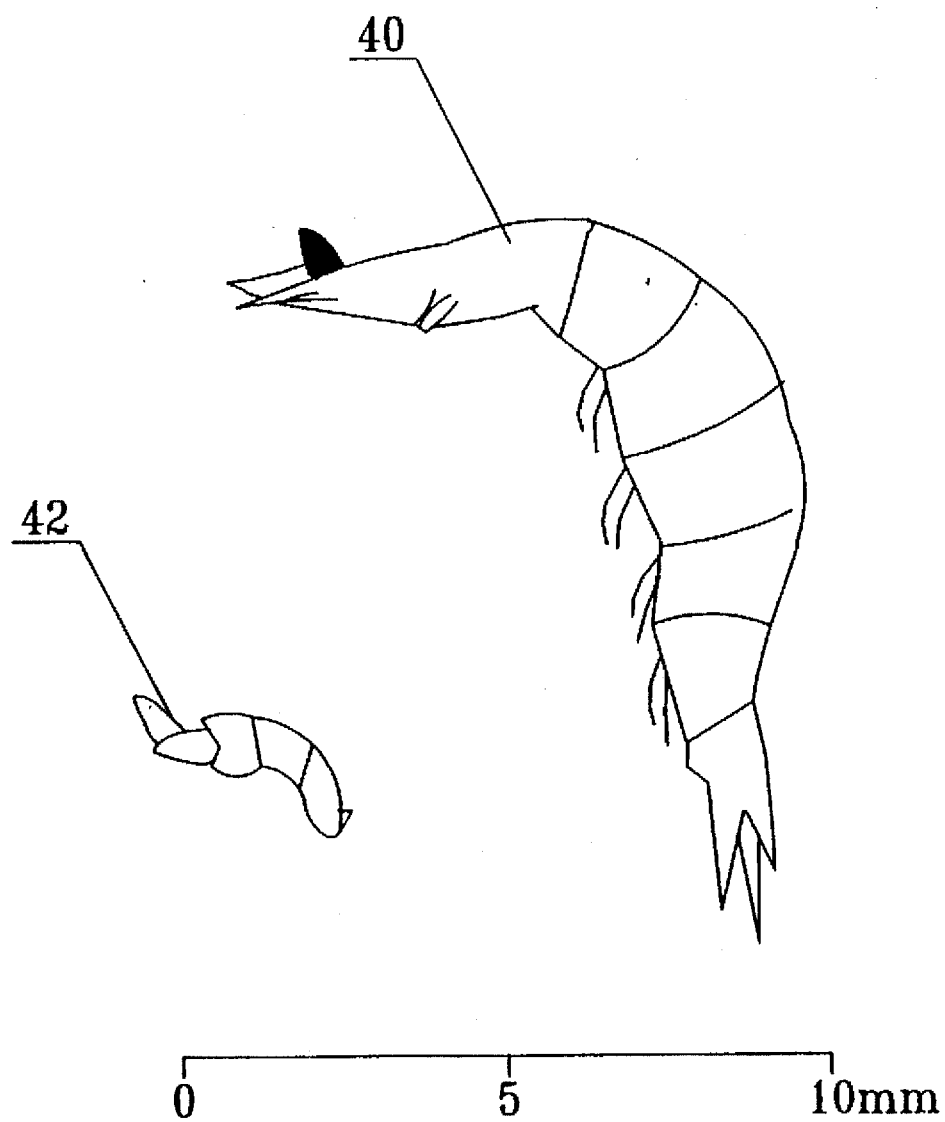
FIG. 3 is an illustration of a typical whole dried krill carcass as produced using the present invention.

The dried krill product so produced is shown in FIG. 3 and will consist mainly of whole krill 40 and a significant portion of krill pieces similar to those shown at 42, and will not contain a substantial mount of powdered krill.

Figure 2:
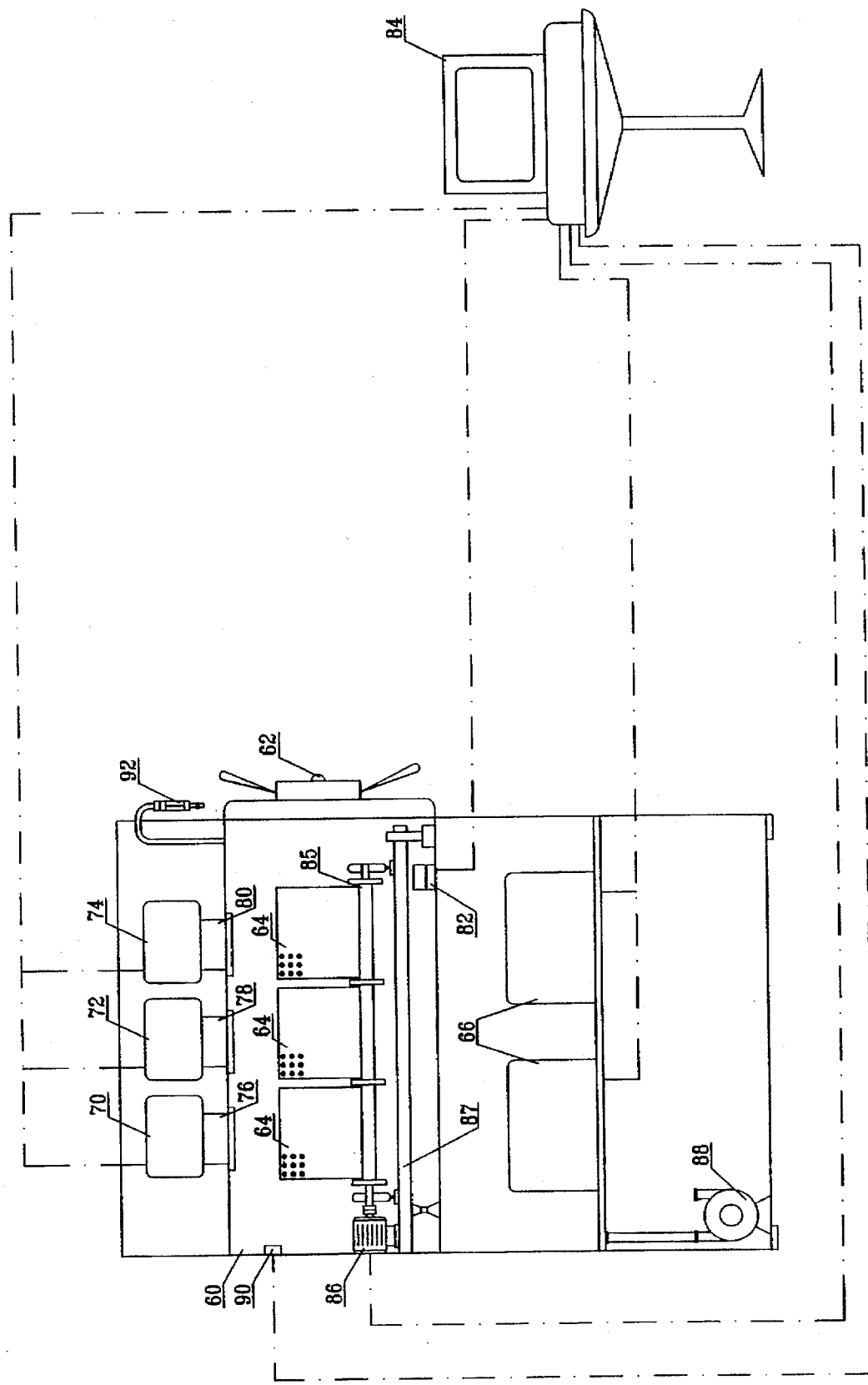
FIG. 2 is a diagram of one embodiment of the apparatus of the present invention.

Turning to FIG. 2, equipment for carrying the process of the present invention is illustrated schematically. The equipment includes a microwave and vacuum chamber 60 having an inlet door 62. The krill product in suitable, substantially cylindrical shaped (for rotation within the chamber 60 as will be described below) containers (baskets) 64 of is delivered to the chamber 60. The baskets 64 are substantially right cylindircal containing the product are introduced into the chamber 60 at the appropriate point in the process (depending on where microwave power is to be first applied, for example to defrost frozen krill) and are sealed within the chamber 60 for the application of energy, reduced pressure and sweeping of surfaces with dry air as described above.

The microwave energy is provided in the illustrated system by three magnetrons 70, 72 and 74 which inject the microwaves into the chamber 60 through sealing windows 76, 78 and 80 and hence into the basket(s) 64 within the chamber 60.

The baskets 64 are shown supported within the chamber on a rolling system 86 formed by a plurality of horizontal rollers 85 (only one shown) that in turn is preferably supported by a suitable platform 87 on side of which is supported by a load cell 82 which measures the weight in the chamber 60 and delivers this information to the control computer 84. The rolling of the basket 64 during the process applies a tumbling action to the krill.

Suitable temperature and pressure gauges schematically indicate at 90 measure the temperature and pressure in the chamber 60 and provide this information to the control computer 84.

Below atmospheric pressure is applied by vacuum pump 88 controlled by computer 84 to reduce ambient pressure within the chamber to the appropriate level, at the appropriate time in the process and air is bled into the chamber 60 at the appropriate times under control of the flow meter 92 which in turn regulates the air flow based on the commands from the computer 84.

After completion of the operation to be carried out in the chamber 60 the baskets 64 are removed through the door 62.

Destructive enzyme reactions take place within a few hours at temperatures above freezing, especially when oxygen content is high around the krill and these reactions change the natural red color of fresh krill to black, and also cause a loss of protein content due to enzyme catalyzed hydrolysis during drying. The vacuum condition, the elevated temperature during the initial heating step 22 and the rapid drying rate during steps 24, 26, 28 and 30 substantially prevent these reactions.

EXAMPLE 1:

The frozen krill (*Euphausia pacifica*) are defrosted first and drained of free water. 5.0 kilograms of krill with initial moisture content of 80% by weight are placed into plastic rolling (cylindrical) basket (FIG. 1 ) then moved into the microwave vacuum dehydration system 60. High intensity microwave power (above defined), high rate of rotation of the basket on a horixontasl axis (4 RPM) and 120 Torr of ambient pressure are used in step 22. There is no air injection flow during the step 22. The temperature of the krill is about 60° C. in the initial heating step 22. The chamber pressure in the step 22 is 100 Torr and the time is 10 minutes. At end of step 22, the moisture content ofkrill is 78% by weight.

After the initial heating step 22, the krill are next subjected to a separation and surface drying step 24 wherein high intensity microwave energy is applied. The air injection flow rate is $5.6 \times 10^{-5}$ m$^3$/kg.s with air temperature 20° C. The chamber pressure in step 24 is 120 Torr. The separation and surface drying step 24 is 15 minutes long. High air flow rate quickly sweeps water vapor out of the chamber and the surface of krill dry without sticking to each other. The moisture content of krill at end of the separation and surface drying step 24 is 74.6% by weight.

In the bulk water removal step 26 following step 24 the ambient pressure is 100 Torr and air injection flow rate is $2.8 \times 10^{-5}$ m$^3$/kg.s. The rotational speed of basket is 2 RPM. and the temperature of krill is 65° C. High intensity of microwave is used in this step. At end of step 26, the krill weigh 2.2 kilograms with moisture content of 63% by weight. End drying step drying step 28 was finished by air dryer in this example.

The final krill product after above treatment has a natural red color which was measured by LabScan Color Meter (Hunter Associate Laboratory, Inc.), L=30.92, a =12.94, and b=6.81. The protein content of dried krills is about 54% by weight. The final moisture content is 12% by weight.

EXAMPLE 2:

Following the flow chart in FIG. 1, the six kilograms of fresh krill with initial moisture content of 77% by weight are placed into plastic cylindrical basket then moved in microwave vacuum dehydration system in the pre-treatment step 20. The initial heating step 22 following step 20 applies high intensity microwave energy (0.6 kW/kg krill), high rotation rate (4 RPM) and 15.95 kPa (120 Torr) of ambient pressure. No air injection is used in the step 22. The temperature of krill is 60° C. in the initial heating step 22 and heating time is 10 minutes long. At end of the step 22, the krill weigh is reduced to 4.38 kilograms and the moisture content is 70% by weight.

High intensity microwave energy (0.65 kW/kg.krill), high rotation speed (4 RPM), high air injection flow rate, $5.6 \times 10^{-5}$ m$^3$/kg.s, and 15.95 kPa absolute (120 Torr) ambient pressure are applied in surface drying step 24 after the step 22. The surface of krill is dried quickly. At end of separation drying step 24, the krill are separated from each other and krill surfaces are more dry than inside the body. The drying time during the separation and drying step 24 is ten minutes. The weight of krill at end of the step 24 is 3.5 kg with 62 percent of moisture content by weight.

In the bulk water removal step 26 following the step 24 the ambient pressure is 13.28 kPa and air injection flow rate is $2.8 \times 10^{-5}$ m$^3$/kg.s. The rotational speed of the plastic basket is 2 RPM. The moisture content of krill at end of bulk water removal step 26 is 35% by weight and the total weight of krill is reduced to 2.04 kilograms. Time is 45 minutes from the beginning of drying.

After the bulk water removal step 26, krill are finish dried in low intensity, high vacuum and low air current injection rate, in the finish drying step 28, i.e. 0.4 kW per kilogram of krill, 10.63 kPa ambient pressure, $2.8 \times 10^{-5}$ m$^3$/kg.s of air injection flow rate (air temperature is 20° C.) and the basket is revolving at one RPM. The duration of the finish drying step 28 is 20 minutes. The dehydrated krill leaving the step 28 has a weight of 1.48 kilograms with a moisture content of 11.5% by weight. The color of the dried krill product was measured by LabScan Color Meter (Hunter Association Laboratory, Inc.). The results of measure are L=33.16, a=16.36 and b=6.81. The protein content was about the same as the last example.

Having described the invention modifications will be evident to those skilled in the art without departing from the invention as defined in the appended claims.

We claim:

1. A method for producing dried krill products in the form of whole but separate carcasses comprising arranging raw krill in an at least partially separated arrangement in a microwave transparent carrier, partially drying said raw krill to provide a partially dried product substantially free of surface moisture but containing a first amount of unbound moisture within its structure, heating said partially dried product by means of electromagnetic radiation, subjecting said partially dried product to a reduced pressure below atmospheric pressure during at least a portion of the period of time in which said product is subjected to electromagnetic radiation to provide a heated dried product containing unbound within its structure a second amount of moisture sufficient to generate flexibility and strength in the product, such that the form of whole krill is maintained during the drying process, and subjecting said krill to a tumbling action during said partial drying and said heating by of electromagnetic radiation.

2. A method as defined in claim 1 wherein said partial drying includes defrosting said raw krill prior to heating said partially dried product by means of electromagnetic radiation.

3. A method as defined in claim 1 wherein subjecting said partially dried product to reduced pressure below atmospheric pressure includes sweeping surfaces of said product with moisture unsaturated air.

4. A method as defined in claim 3 wherein said second amount of moisture comprises between 10 and 40% by weight of the dried product.

5. A method as defined in claim 3 wherein said pressure below atmospheric pressure is less than 120 Torr and said pressure is attained in less than 2 minutes.

6. A method as defined in claim 3 wherein said pressure below atmospheric pressure is less than 100 Torr and said pressure is attained in less than 1.7 minutes.

7. A method as defined in claim 3 wherein said dried product is heated to a temperature of between 50° and 90° C.

8. A method as defined in claim 3 wherein said electromagnetic radiation comprise microwaves.

9. A method as defined in claim 1 wherein said second amount of moisture comprises between 10 and 40% by weight of the dried product.

10. A method as defined in claim 9 wherein said pressure below atmosphere pressure is less than 120 Torr and said pressure is attained in less than 2 minutes.

11. A method as defined in claim 9 wherein said pressure below atmospheric pressure is less than 100 Torr and said pressure is attained in less than 1.7 minutes.

12. A method as defined in claim 9 wherein said dried product is heated to a temperature of between 40° and 90° C.

13. A method as defined in claim 9 wherein said electromagnetic radiation comprise microwaves.

14. A method as defined in claim 1 wherein said pressure below atmospheric pressure is less than 120 Torr and said pressure is attained in less than 2 minutes.

15. A method as defined in claim 14 wherein said dried product is heated to a temperature of between 40° and 90° C.

16. A method as defined in claim 14 wherein said electromagnetic radiation comprise microwaves.

17. A method as defined in claim 1 wherein said pressure below atmospheric pressure is less than 100 Torr and said pressure is attained in less than 1.7 minutes.

18. A method as defined in claim 1 wherein said dried product is heated to a temperature of between 40° and 90° C.

19. A method as defined in claim 1 wherein said electromagnetic radiation comprise microwaves.

* * * * *